United States Patent
Sang et al.

(10) Patent No.: US 12,481,549 B1
(45) Date of Patent: Nov. 25, 2025

(54) COMMUNICATION ERROR HANDLING IN A MEMORY SUB-SYSTEM

(71) Applicant: Micron Technology, Inc., Boise, ID (US)

(72) Inventors: He Sang, Shanghai (CN); Liang Hua, Shanghai (CN); Xiaolong He, Shanghai (CN); Chao Ye, Shanghai (CN); Baojian Wang, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/789,425

(22) Filed: Jul. 30, 2024

(51) Int. Cl.
G06F 11/00 (2006.01)
G06F 11/07 (2006.01)

(52) U.S. Cl.
CPC ...... G06F 11/0793 (2013.01); G06F 11/0709 (2013.01)

(58) Field of Classification Search
CPC ............ G06F 11/0793; G06F 11/0709
See application file for complete search history.

(56) References Cited

U.S. PATENT DOCUMENTS 5,568,608 A * 10/1996 Shannon ............... G11B 19/02
2016/0202914 A1 * 7/2016 Hsu ..................... G06F 3/0683
711/158

* cited by examiner

Primary Examiner — Jason B Bryan
(74) Attorney, Agent, or Firm — Schwegman Lundberg & Woessner, P.A.

(57) ABSTRACT

A communication error between a memory sub-system controller and a memory device is detected. Based on the communication error being detected, execution of command processing by the memory sub-system controller is suspended. Command data comprising a snapshot of a command queue of the memory sub-system controller is stored. The command queue comprises one or more commands. The command queue is flushed. The memory sub-system is returned to a normal state of operation. One or more recovery actions are performed to attempt recovery of the memory device. Based on determining recovery of the memory device is unsuccessful, affected portions of the memory device are marked as retired. The one or more commands from the command queue are reissued.

20 Claims, 5 Drawing Sheets

COMMUNICATION ERROR HANDLING IN A MEMORY SUB-SYSTEM

TECHNICAL FIELD

Embodiments of the disclosure relate generally to memory sub-systems and, more specifically, to communication error handling in a memory sub-system.

BACKGROUND

A memory sub-system can be a storage system, such as a solid-state drive (SSD), and can include one or more memory devices that store data. The memory devices can, for example, include non-volatile memory components and volatile memory components. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
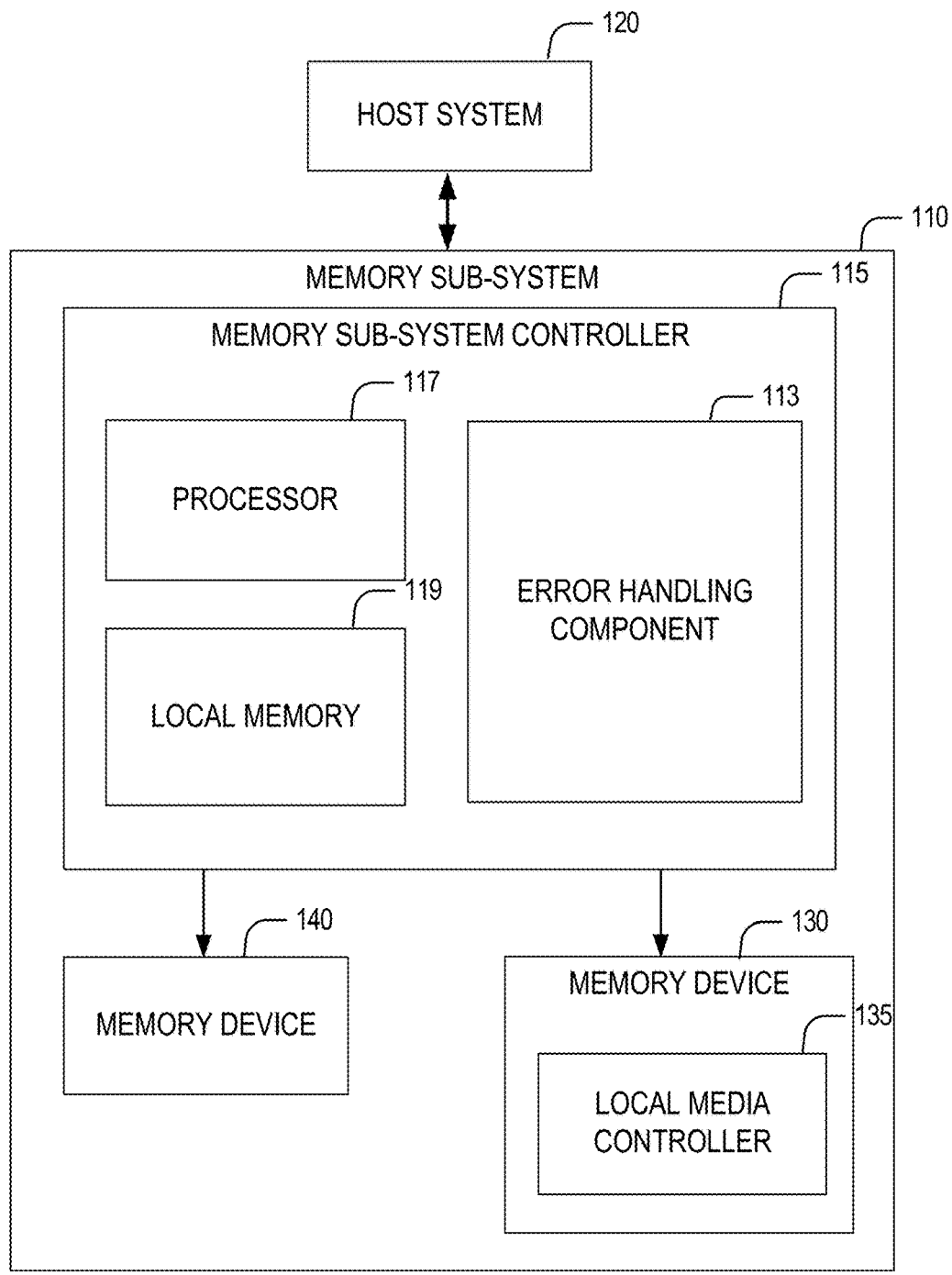
FIG. 1 is a block diagram illustrating an example computing environment that includes a memory sub-system, in accordance with some embodiments of the present disclosure.

Aspects of the present disclosure are directed to communication error handling in a memory sub-system. A memory sub-system can be or include a memory device (e.g., SSD), a memory module, or a combination of a memory device and memory module. A memory device can be a non-volatile memory device. One example of a non-volatile memory device is a negative-and (NAND) memory device. Other examples of non-volatile memory devices are described below in conjunction with FIG. 1.

A NAND memory device can include multiple NAND dies. Each die may include one or more planes and each plane includes multiple blocks. Each block includes an array that includes pages (rows) and strings (columns). A string includes a plurality of memory cells connected in a series. A memory cell ("cell") is an electronic circuit that stores information. Depending on the cell type, a cell can store one or more bits of binary information and have various logic states that correlate to the number of bits being stored. The logic states can be represented by binary values, such as "0" and "1," or combinations of such values.

Various memory access operations can be performed on the memory cells. Data can be written to, read from, and erased from memory cells. Memory cells can be grouped into a write unit, such as a page. For some types of memory devices, a page is the smallest write unit. A page size represents a particular number of cells of a page. For some types of memory devices (e.g., NAND), memory cells can be grouped into an erase unit, such as a block. Data can be written to a block, page-by-page. Data can be erased at a block level. However, portions of a block cannot be erased.

In general, a host system can utilize a memory sub-system that includes one or more memory devices that store data. For example, the host system can provide data to be stored at the memory sub-system and can request data to be retrieved from the memory sub-system. A memory sub-system controller, typically an Application-Specific Integrated Circuit (ASIC), typically receives commands or operations from the host system and converts the commands or operations into instructions or appropriate commands to achieve the desired access to the memory components of the memory sub-system. Communication between a memory sub-system controller and a memory device is crucial for the proper functioning of the memory sub-system, but this communication is susceptible to errors that can significantly impact performance and reliability.

Traditionally, memory devices handle communication errors by entering a panic state, designed to prevent further data corruption by halting all operations. While this approach is protective, it also renders the memory device temporarily unusable until the issue is manually resolved. The immediate system downtime caused by the panic state can be critical in environments where continuous data availability is essential, such as in server and enterprise settings. Moreover, when in a panic state, the memory device is completely inaccessible, preventing any data retrieval or further operations, which can lead to significant delays in system recovery and potential data loss.

Additionally, the traditional approach often provides limited information about the error, typically through the dumping of controller registers, which lacks the detail necessary to diagnose and address the root cause of the error effectively. This leads to challenges in preventing future occurrences and often requires intervention from the manufacturer of the device, further delaying resolution and increasing dependency.

Aspects of the present disclosure address techniques for communication error handling with a memory sub-system that includes a recovery flow that avoids placing the device in a panic state, provides detailed diagnostic information, and allows for greater user control in managing memory device operations and errors. In an example, the memory sub-system initiates the recovery flow in response to detecting a communication error. The recovery flow includes storing a snapshot of the state of controller registers, suspending execution of command processing by the controller, storing a snapshot of a command queue, flushing the command queue, returning the controller to a normal state of operation, performing recovery actions to attempt recovery of the memory device, marking affected portions as retired in response to unsuccessful recovery, and reissuing commands based on the command queue snapshot. This recovery flow not only preserves the integrity and accessibility of data but also enhances the device's resilience against transient and unpredictable errors, significantly improving reliability and user trust in the technology.

By utilizing a recovery flow that circumvents the need for a panic state, the memory sub-system ensures that the memory device remains operational even in the face of such errors, thereby drastically reducing downtime and maintaining continuous data availability. This is particularly beneficial in environments like server and enterprise settings where data accessibility is paramount. Furthermore, the recovery flow enhances diagnostic capabilities by providing detailed debug information, which facilitates a more effective diagnosis and resolution of the underlying issues. This comprehensive diagnostic data allows users and system administrators to better understand and preempt potential failures, reducing dependency on manufacturer support and enabling quicker, more autonomous recovery actions. Overall, the recovery flow not only improves the reliability and usability of memory devices during communication errors but also enhances the overall user experience by minimizing disruptions and data loss risks.

FIG. 1 illustrates an example computing environment 100 that includes a memory sub-system 110, in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a SSD, a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to one or more memory sub-systems 110. In some embodiments, the host system 120 is coupled to different types of memory sub-systems 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, and so forth.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a compute express link (CXL) interface, a USB interface, a Fibre Channel interface, a Serial Attached SCSI (SAS) interface, and so forth. The physical host interface can be used to transmit data between the host system 120 and the memory sub-system 110. The host system 120 can further utilize a Non-Volatile Memory Express (NVMe) interface to access the memory devices 130 and 140 when the memory sub-system 110 is coupled with the host system 120 by the PCIe or CXL interface. The physical host interface provides physical links with multiple communication lanes (also referred to herein simply as "lanes") for passing control, address, data, and other signals between the memory sub-system 110 and the host system 120.

The memory devices can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

An example of non-volatile memory devices (e.g., memory device 130) includes a NAND type flash memory. Each of the memory devices 130 can include one or more arrays of memory cells such as SLCs, multi-level cells (MLCs) (e.g., TLCs, or quad-level cells [QLCs]). In some embodiments, a particular memory component can include an SLC portion, and an MLC portion, a TLC portion, or a QLC portion of memory cells. Each of the memory cells can store one or more bits of data used by the host system 120. Furthermore, the memory cells of the memory devices 130 can be grouped as memory pages or memory blocks that can refer to a unit of the memory component used to store data.

Although non-volatile memory components such as NAND type flash memory are described, the memory device 130 can be based on any other type of non-volatile memory, such as read-only memory (ROM), phase change memory (PCM), magneto random access memory (MRAM), NOR flash memory, electrically erasable programmable read-only memory (EEPROM), and a cross-point array of non-volatile memory cells. A cross-point array of non-volatile memory can perform bit storage based on a change of bulk resistance in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

A memory sub-system controller 115 can communicate with the memory devices 130 to perform operations such as reading data, writing data, or erasing data at the memory devices 130, and other such operations. The memory sub-system controller 115 can include hardware such as one or more integrated circuits and/or discrete components, a buffer memory, or a combination thereof. The memory sub-system controller 115 can be a microcontroller, special purpose logic circuitry (e.g., a field programmable gate array (FPGA), an application specific integrated circuit (ASIC), etc.), or another suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and the like. The local memory 119 can also include ROM for storing micro-code. While the example memory sub-system 110 in FIG. 1 has been illustrated as including the memory sub-system controller 115, in another embodiment of the present disclosure, a memory sub-system 110 may not include a memory sub-system controller 115, and may instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical block address and a physical block address that are associated with the memory devices 130. The memory sub-system controller 115 can further include host interface circuitry to communicate with the host system 120 via the physical host interface. The host interface circuitry can convert the commands received from the host system into command instructions to access the memory devices 130 and convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory device 130.

The memory sub-system 110 also includes an error handling component 113 that is responsible for handling errors detected within the memory sub-system 110. For example, the error handling component 113 initiates a recovery flow to recover the memory sub-system 110 in response to detecting a communication error between the memory sub-system controller 115 and one of the memory devices 130 and 140. Further details regarding the recovery flow and the operation of the error handling component 113 are discussed below.

In some embodiments, the memory sub-system controller 115 includes at least a portion of the error handling component 113. For example, the memory sub-system controller 115 can include a processor 117 (processing device) configured to execute instructions stored in local memory 119 (e.g., firmware) for performing the operations described herein. In some embodiments, the error handling components 113 are part of the host system 120, an application, or an operating system. Further details regarding the operation of the error handling component 113 are discussed below.

Figure 2A:
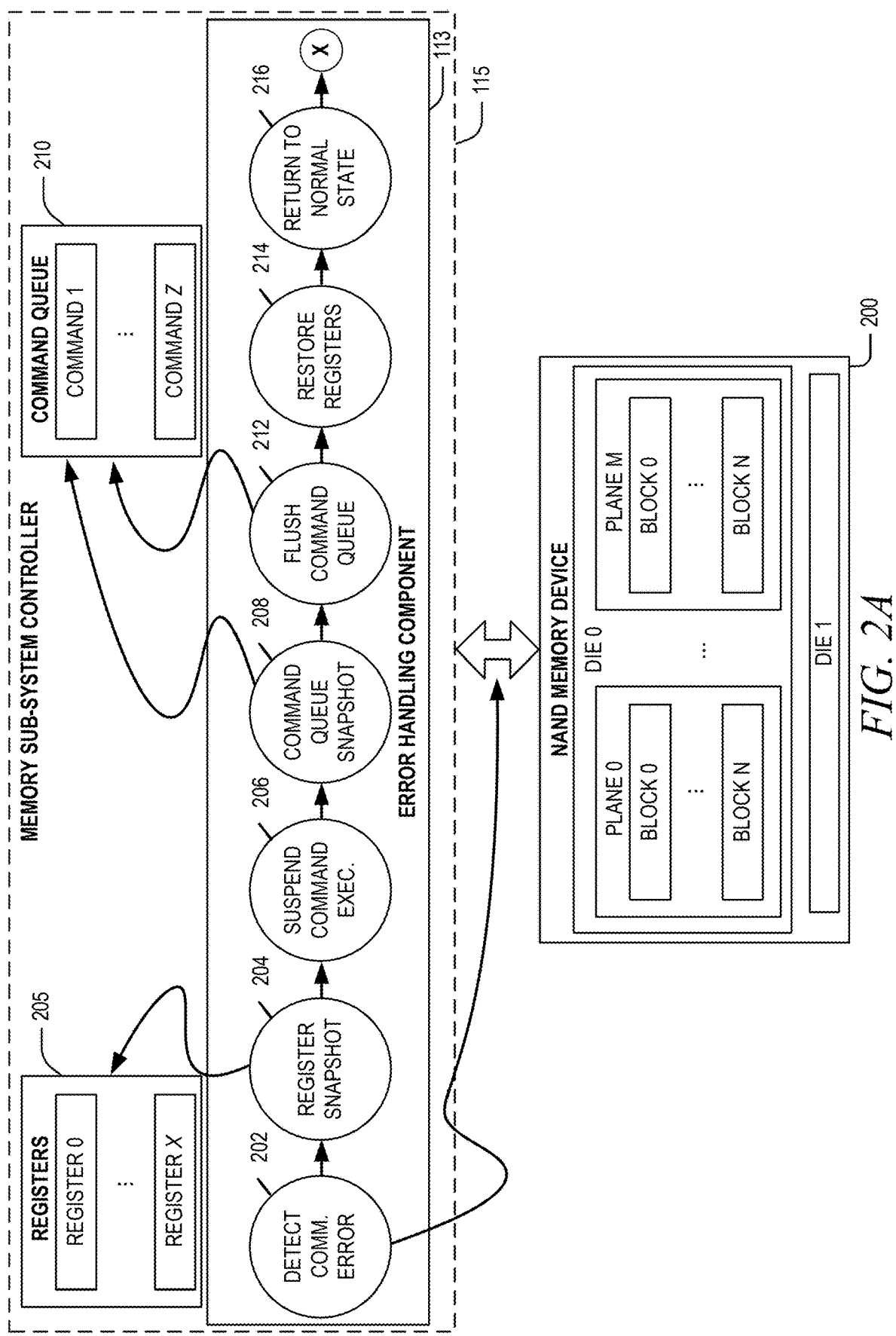
FIGS. 2A and 2B are conceptual diagrams illustrating interactions among components in the memory sub-system in performing communication error handling, in accordance with some embodiments of the present disclosure.
Figure 2B:
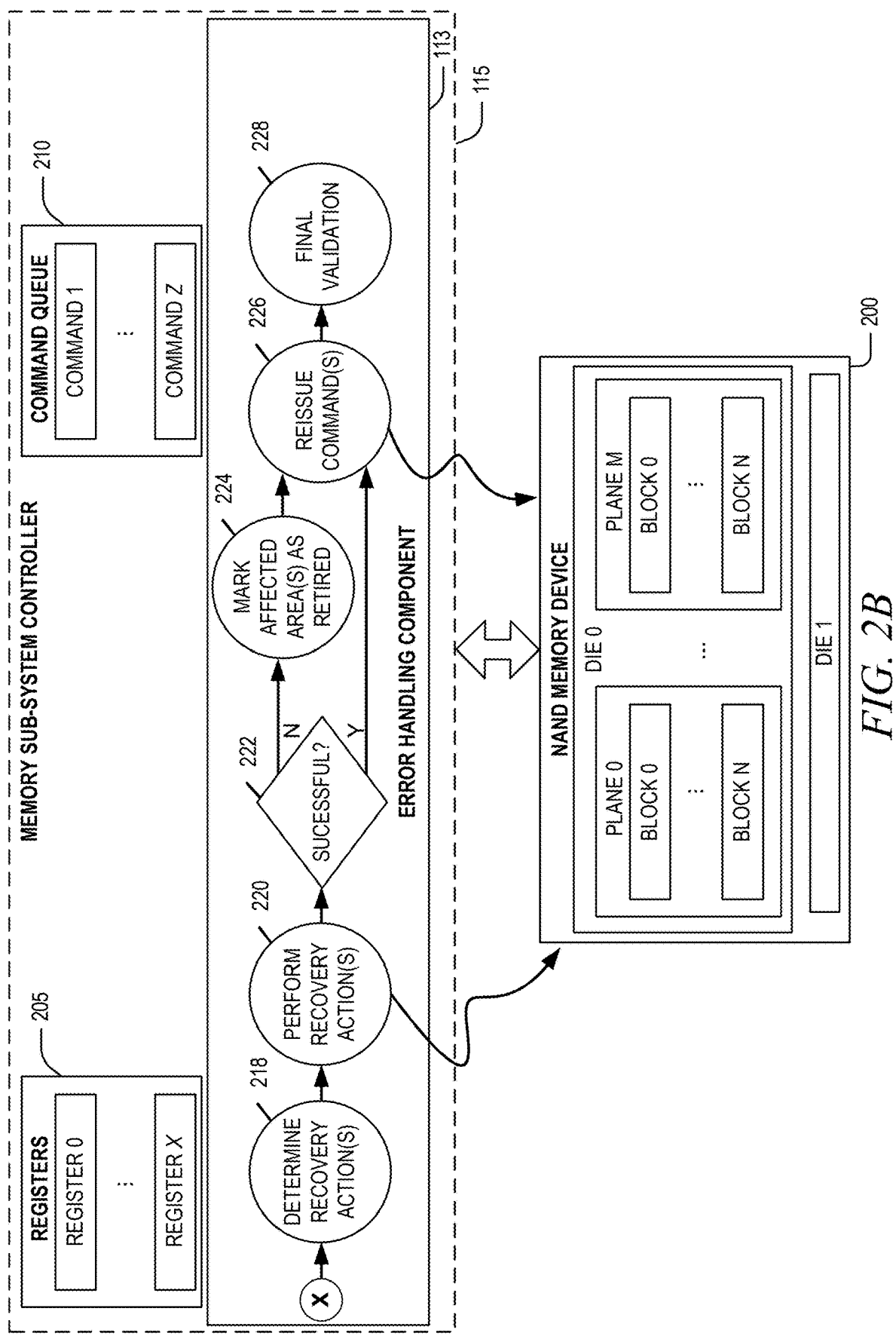

FIGS. 2A and 2B are conceptual diagrams illustrating interactions among components in the memory sub-system in performing communication error handling, in accordance with some embodiments of the present disclosure.

In the example illustrated in FIGS. 2A and 2B, the memory sub-system 110 includes a NAND memory device 200. The NAND memory device 200 is an example of the memory device 130 of FIG. 1. The NAND memory device 200 includes multiple NAND dies. Each die includes multiple planes. Each plane includes multiple blocks. Each block includes a two- or three-dimensional array that includes pages (rows) and strings (columns). A string includes a plurality of memory cells connected in a series. Each memory cell is used to represent one or more bit values. For example, a single NAND flash cell includes a transistor that stores an electric charge on a memory layer that is isolated by oxide insulating layers above and below. Within each cell, data is stored as the Vt of the transistor. SLC NAND cells, for example, can store one bit per cell while QLC NAND cells can store four bits per cell. Other types of memory cells, such as MLCs, TLCs, QLCs, and penta-level cells (PLCs), can store multiple bits per cell.

With reference to FIG. 2A, the error handling component 113 continuously monitors the communication between the controller 115 and the NAND memory device 200. At operation 202, the error handling component 113 detects a communication error between the controller 115 and the NAND memory device 200. The communication error can be due to various reasons such as signal integrity issues, synchronization errors, or hardware malfunctions.

In response to detecting the communication error, the error handling component 113 automatically triggers a dump of the controller 115 registers 205, at operation 204. This involves capturing a current state of the registers 205 within the controller 115. The registers 205 may include, but are not limited to, command registers, status registers, configuration registers, and any special-purpose registers related to NAND operations.

The error handling component 113 captures the data from the registers 205 (referred to herein as "register data") in real-time. This snapshot includes values that represent the operational state of the controller 115 at the moment the error was detected. This might include data about ongoing commands, error codes, status flags, and other diagnostic parameters that can provide insights into the cause of the error.

Once captured, the error handling component 113 stores the register data in a designated diagnostic area within the memory device 200 such as a Field System Area (FSA), which is an area within the memory device 200 that is reserved for storing diagnostic information and is protected from regular data operations to ensure its integrity and accessibility for diagnostic purposes.

The stored register data can be accessed by diagnostic tools and used for post-error analysis. This analysis helps in diagnosing the exact cause of the error, understanding the conditions leading up to the error, and formulating strategies to prevent similar errors in the future. The recorded register data is made accessible to system administrators or diagnostic tools via a secure interface. This allows for detailed examination and troubleshooting, enabling a deeper understanding of the behavior of the controller 115 at the time of the error. In addition to aiding in diagnostics, the recorded register data can also be used in recovery operations. By analyzing the state of the controller 115 as recorded in the registers 205, the error handling component 113 can make informed decisions about the necessary recovery actions, such as resetting specific components or reconfiguring the device to avoid further errors.

In addition, upon detecting the error, the error handling component 113 suspends the execution of all command processing by the controller 115, at operation 206, to prevent any further data corruption or loss and to stabilize the memory sub-system 110 for a detailed analysis.

At operation 208, the error handling component 113 generates a snapshot of a command queue 210 within the controller 115. The command queue 210 includes one or more commands that are currently being processed or are scheduled to be processed by the NAND memory device 200. This snapshot includes command identifiers, status, priority, and other relevant metadata that describes each command's intended operation and its current state. Each command in the queue 210 is collected by the error handling component 113 and stored in a secure memory location. This collection includes not only the commands themselves but also any associated data buffers, control signals, and intermediate computation results. This ensures that the entire context of each command is preserved. The collected data is stored in a designated area of the memory device 200 that is reserved for error logging and recovery operations. This designated area is protected from normal data operations to prevent overwriting and to ensure data integrity during the recovery process.

If the error has caused commands to become stuck or corrupted in the command queue 210, the error handling component 113 flushes these commands from the command queue 210, at operation 212. This ensures that when the controller 115 resumes operation, it starts with a clean slate, free from any problematic commands that could re-trigger errors.

The error handling component 113 restores one or more of the registers 205 within the controller 115 that were affected by the error to their default or last-known-good states, at operation 214, to ensure that the configuration of the controller 115 is correct and that it can operate as expected.

The error handling component 113 examines register data, status indicators, and other diagnostic data that can provide insights into the error to determine the nature and extent of the disruption. Based on this analysis, the error handling component 113 returns the controller 115 to a normal state of operation, at operation 216. This may involve resetting error flags, clearing buffers, or performing a soft reset of the controller 115 to clear its operational state. With the state of the controller 115 normalized and errors cleared, the error handling component 113 causes the controller 115 to resume command processing. In an example, initially, command processing is performed in a limited or controlled mode to monitor performance of the controller 115 and ensure that the recovery was successful.

After resuming operations, the controller 115 is closely monitored by the error handling component 113 for signs of recurring issues. For example, the error handling component 113 may run validation tests to ensure that all functions are performing correctly and that the controller 115 is stable. Depending on the outcome of the monitoring and validation phase, the error handling component 113 may perform further adjustments or optimizations to the configuration of the controller 115 or to the operational parameters of the memory device 200 to enhance stability and performance.

With reference to FIG. 2B, at operation 218, the error handling component 113 determines one or more recovery actions for recovering the memory device 200. To determine the one or more recovery actions, the error handling component 113 assesses the status of the memory device 200 by sending a series of diagnostic commands to the memory device 200. These commands help the error handling component 113 determine the nature of the error and check the operational status of the memory cells and other components within the device 200. The error handling component 113 performs the one or more recovery actions to attempt to recover the memory device 200, at operation 220. Performing the one or more recovery actions can include sending one or more reset commands to the memory device 200 to clear error states or attempt to reinitialize communication protocols.

After attempting recovery actions, the error handling component 113, at operation 222, determines whether the recovery was successful. The error handling component 113 determines whether recovery was successful by polling the memory device 200 with status requests and checking response signals and status codes returned by the memory device 200.

If the memory device 200 returns to a normal operational state, the error handling component 113 resumes normal operations, carefully monitoring the device to ensure stability. If the error handling component 113 determines that the recovery of the memory device 200 was unsuccessful, the error handling component 113 marks affected portions of the memory device 200 as retired, at operation 224, to prevent further attempts to use these sections, thereby protecting data integrity. The affected portions may comprise one or more logical units, each of which are identified by a logical unit number (LUN). In instances where certain portions of the memory device 200 are deemed irrecoverable, the error handling component 113 may attempt to salvage any recoverable data and reallocate it to healthy logical units of the memory device 200 to minimize data loss.

Following a recovery attempt, whether successful or partial, the error handling component 113 may adjust operational parameters or reconfigure settings to optimize performance and reduce the likelihood of future errors. Throughout the recovery process, all actions and outcomes are logged by the error handling component 113. This detailed logging aids in future troubleshooting and helps in refining error handling protocols. After the recovery process, the error handling component 113 continues to monitor the memory device 200 closely to ensure its continued stability and to quickly address any subsequent issues that may arise.

With all ongoing commands securely stored, system administrators or automated recovery processes can analyze the commands to determine the best course of action. This might involve modifying commands to correct errors, reordering commands to optimize recovery, or discarding commands that cannot be salvaged. Once the analysis is complete and necessary adjustments are made, the commands are reissued to the NAND memory device 200, at operation 226. The error handling component 113 ensures that these commands are executed in an order that maintains data integrity and stability of the memory sub-system 110. This might involve prioritizing certain commands or introducing new commands to facilitate recovery. In addition, the error handling component 113 validates each command in the queue to ensure that it is still relevant and safe to execute. This involves checking the status of the data and the operational state of the memory device 200 to ensure that the conditions under which the commands were originally issued have not changed in a way that would make execution problematic. The error handling component 113 also checks for dependencies among commands. Some commands may depend on the successful execution of others, and such dependencies must be resolved in the correct sequence to maintain data integrity.

Before reissuing commands, the error handling component 113 ensures that all necessary resources are available to prevent system overload or conflicts during command execution. This includes sufficient power, available memory buffers, and any other system resources required for command execution.

Commands are reissued to the memory device 200 in a controlled manner, starting with lower-risk commands or those that are critical for recovery of the memory sub-system 110. The error handling component 113 may adjust the timing of command issuance to manage system load and optimize performance. As commands are reissued and executed, the error handling component 113 closely monitors the execution process. This monitoring helps quickly detect if any command fails to execute correctly or if it results in unexpected behavior. Immediate corrective actions can be taken if issues are detected. If any errors occur during the reissuance or execution of commands, the error handling component 113 engages error handling protocols. This may involve aborting commands, rolling back operations, or reattempting command execution under modified conditions.

In some examples, the error handling component 113 uses feedback from the execution of reissued commands to update system logs and inform subsequent operations. This feedback is useful for adaptive learning in the system, allowing the controller to optimize command handling procedures and improve error recovery strategies.

Once all commands have been successfully reissued and executed, a final validation step is performed by the error handling component 113, at operation 228 to ensure that all operations have been completed as expected and that the memory sub-system 110 is stable. This may involve running diagnostic checks or performance assessments.

Figure 3:
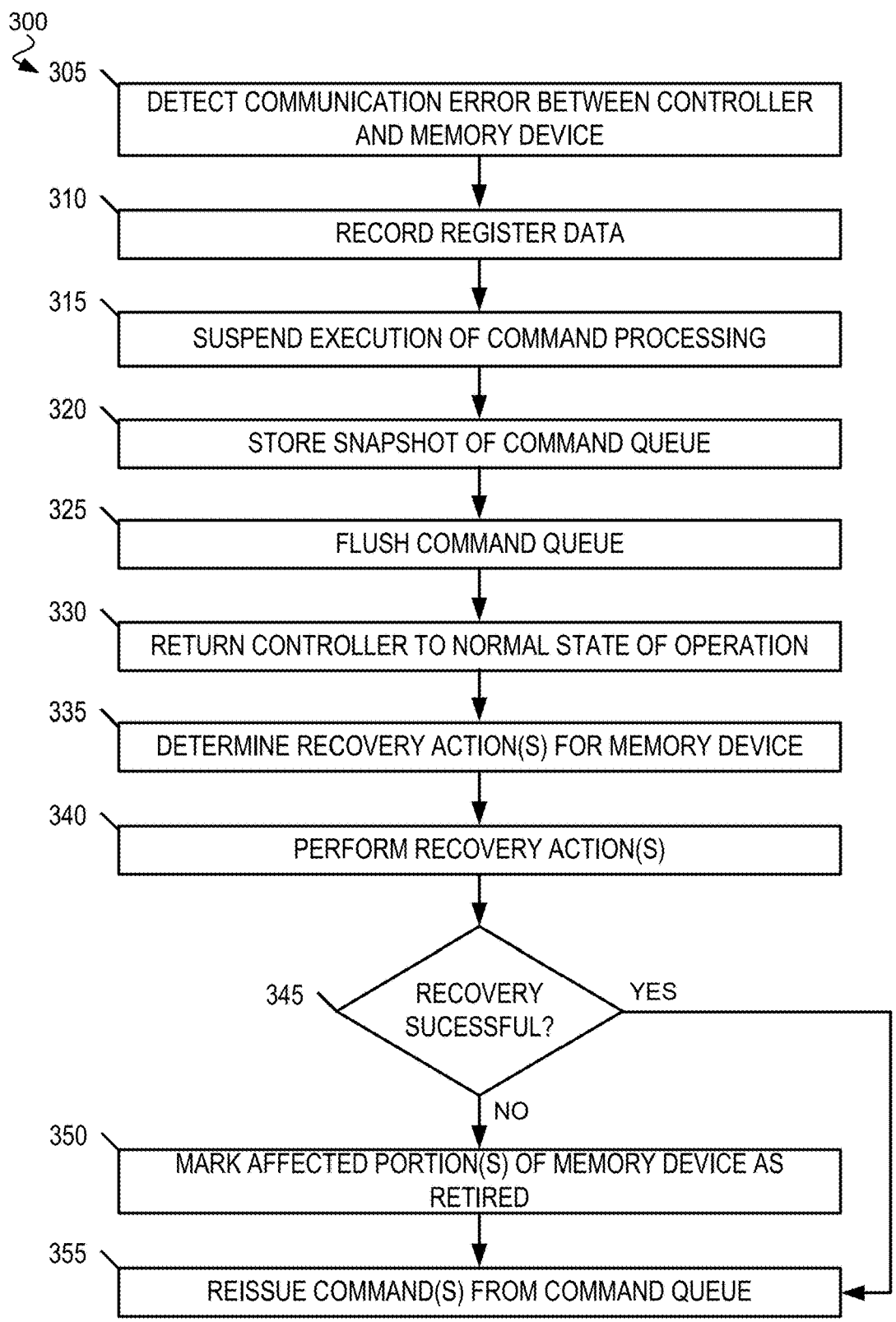
FIG. 3 is a flow diagram illustrating an example method for performing communication error handling in a memory sub-system, in accordance with some embodiments of the present disclosure.

FIG. 3 is a flow diagram illustrating an example method 300 for performing communication error handling in a memory sub-system, in accordance with some embodiments of the present disclosure. The method 300 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 300 is performed by the error handling component 113 of FIG. 1. Although processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 305, a processing device detects a communication error between a memory sub-system controller and a memory device. Detecting the communication error can include detecting a missing data signal.

In response to detecting the communication error, the processing device, at operation 310, records register data reflecting a current state of each register in a set of registers within the memory sub-system controller. The set of registers includes any one or more of: a command register, a status register, a configuration register, or a special-purpose register related to operation of the memory device. The processing device captures data in real-time. The register data includes values that represent an operational state of the memory sub-system controller at the moment the communication error was detected. As an example, the register data can include data about ongoing commands, error codes, status flags, and other diagnostic parameters that provide insights into the cause of the communication error.

The recording of the register data comprises storing the register data in a designated diagnostic area within the memory device (e.g., a Field System Area (FSA)). This area is reserved for storing diagnostic information and is protected from regular data operations to ensure its integrity and accessibility for diagnostic purposes. The stored register data can be accessed by diagnostic tools and used for post-error analysis. This analysis helps in diagnosing the exact cause of the communication error, understanding the conditions leading up to the error, and formulating strategies to prevent similar errors in the future. The stored register data is accessible to system administrators or diagnostic tools via a secure interface that allows for detailed examination and troubleshooting, enabling a deeper understanding of the system's behavior at the time of the error. In addition to aiding in diagnostics, the recorded register data can also be used in recovery operations. By analyzing the state of the device as recorded in the registers, the processing device can make informed decisions about the necessary recovery actions, such as resetting specific components or reconfiguring the device to avoid further errors.

At operation 315, the processing device suspends execution of command processing by the memory sub-system controller. The processing device suspends the execution of command to prevent any further data corruption or loss and to stabilize the memory sub-system for a detailed analysis.

At operation 320, the processing device stores command data comprising a snapshot of a command queue of the memory sub-system controller. The command queue includes all commands that are currently being processed or are scheduled to be processed. The command data includes, for each logged command, a command identifier, a status, a priority, and other relevant metadata that describes the command's intended operation and current state. The command data is stored in a designated area of the memory device that is reserved for error logging and recovery operations. This area is protected from normal data operations to prevent overwriting and to ensure data integrity during the recovery process.

At operation 325, the processing device flushes the command queue. That is, the processing device removes any stuck or corrupted commands from the command queue. This ensures that when the memory sub-system controller resumes operation, it starts with a clean slate, free from any problematic commands that could re-trigger errors.

At operation 330, the processing device returns the memory sub-system controller to a normal state of operation. In returning the memory sub-system to the normal state of operation, the processing device analyzes diagnostic data to identify one or more errors and clearing the one or more errors. The diagnostic data can include the command data, the register data, and other such data that can provide insights into memory sub-system controller errors. In addition, the processing device restores the set of registers to their default or last-known-good states. The processing device also causes the memory sub-system to resume command processing. In some examples, the memory sub-system may initially resume command processing in a limited or controlled mode while the performance of the memory sub-system is monitored to ensure successful recovery.

At operation 335, the processing device determines one or more recovery actions for recovering the memory device. To determine the one or more recovery actions, the processing device assesses the status of the memory device by sending a one or more diagnostic commands to the memory device, which in turn provides diagnostic information to the processing device. The diagnostic information helps the processing device determine the nature of the communication error and check the operational status of the memory cells and other components within the device. In some examples, the processing device determines the one or more recovery actions based on the diagnostic information from the processing device as well as the register data.

At operation 340, the processing device performs the one or more recovery actions to attempt recovery of the memory device. Performance of the one or more recovery actions can include sending one or more reset commands to the memory device to clear error states or attempt to reinitialize communication protocols.

The processing device determines whether recovery of the memory device was successful, at operation 345. To determine whether the recovery was successful, the processing device sends one or more status requests to the memory device and the processing device determines whether recovery was successful based at least in part on response signals and status codes received from the memory device.

If the recovery of the memory device is successful, the method proceeds to operation 355, which is discussed in further detail below. If recovery of the memory device is unsuccessful, the processing device marks affected portions of the memory device as retired, at operation 350. This prevents further attempts to use these portions, thereby protecting data integrity. The affected portions include one or more logical units that are identified by a logical unit number (LUN). Hence, in marking affected portions of the memory device as retired, the processing device marks one or more LUNs corresponding to the affected portions as being retired. In some examples, the processing device attempts to salvage any recoverable data from the affected portions and reallocate the data to healthy parts of the memory device to minimize data loss. That is, the processing device attempts to copy data from the one or more affected LUNs to one or more unaffected LUNs.

The processing device, at operation 355, reissues the one or more commands included in the snapshot of the command queue (the command data) to the memory device.

Described implementations of the subject matter can include one or more features, alone or in combination as illustrated below by way of example.

Example 1. A memory sub-system comprising: A memory sub-system comprising: a memory device; a processing device coupled to the memory device, the processing device to perform operations comprising: detecting a communication error between a memory sub-system controller and the memory device; based on detecting the communication error, suspending execution of command processing by the memory sub-system controller; storing command data comprising a snapshot of a command queue of the memory sub-system controller, the command queue comprising one or more commands; flushing the command queue; returning the memory sub-system to a normal state of operation; performing one or more recovery actions to attempt recovery of the memory device; determining whether recovery of the memory device was successful; based on determining recovery of the memory device is unsuccessful, marking affected portions of the memory device as retired; and reissuing the one or more commands from the command queue.

Example 2. The memory sub-system of Example 1, wherein detecting the communication error comprises detecting a missing data signal communicated between the memory device and the memory sub-system controller.

Example 3. The memory sub-system of any one or more of Examples 1 or 2, wherein the operations comprise recording register data representing a current state of each register in a set of registers within the memory sub-system controller.

Example 4. The memory sub-system of any one or more of Examples 1-3, wherein the set of registers comprises at least one of: a command register, a status register, a configuration register, or a special-purpose register related to operation of the memory device.

Example 5. The memory sub-system of any one or more of Examples 1-4, wherein the register data comprises at least one of: data about ongoing commands, error codes, status flags, or other diagnostic parameters.

Example 6. The memory sub-system of any one or more of Examples 1-5, wherein the recording the register data comprises storing the register data within data in a designated diagnostic area within the memory device.

Example 7. The memory sub-system of any one or more of Examples 1-6, wherein returning the memory sub-system to the normal state of operation comprises: identifying one or more errors within the memory sub-system based on an analysis of diagnostic data; clearing the one or more errors; restoring the set of registers to default or last-known-good states; and resuming command processing.

Example 8. The memory sub-system of any one or more of Examples 1-7, wherein performing the one or more recovery actions comprises sending one or more reset commands to the memory device.

Example 9. The memory sub-system of any one or more of Examples 1-8, wherein the operations comprise determining the one or more recovery actions based on diagnostic information received from the memory device.

Example 10. The memory sub-system of any one or more of Examples 1-9, wherein determining whether the recovery of the memory device was successful comprises sending a status request to the memory device.

Example 11. The memory sub-system of any one or more of Examples 1-9, wherein the operations comprise attempting recovery of data stored by the affected portions of the memory device.

Example 12. A method comprising: detecting, by a processing device, a communication error between a memory sub-system controller and a memory device; based on detecting the communication error, recording, by the processing device, register data representing a current state of each register in a set of registers within the memory sub-system controller; suspending, by the processing device, execution of command processing by the memory sub-system controller; storing, by the processing device, command data comprising a snapshot of a command queue of the memory sub-system controller, the command queue comprising one or more commands; flushing, by the processing device, the command queue; returning, by the processing device, the memory sub-system to a normal state of operation; performing, by the processing device, one or more recovery actions to attempt recovery of the memory device; determining, by the processing device, whether recovery of the memory device was successful; based on determining recovery of the memory device is unsuccessful, marking, by the processing device, affected portions of the memory device as retired; and reissuing, by the processing device, the one or more commands from the command queue.

Example 13. The method of Example 12, wherein detecting the communication error comprises detecting a missing data signal communicated between the memory device and the memory sub-system controller.

Example 14. The method of any one or more of Examples 12 or 13, wherein the set of registers comprises at least one of: a command register, a status register, a configuration register, or a special-purpose register related to operation of the memory device.

Example 15. The method of any one or more of Examples 12-14, wherein the register data comprises at least one of: data about ongoing commands, error codes, status flags, or other diagnostic parameters.

Example 16. The method of any one or more of Examples 12-15, wherein the recording the register data comprises storing the register data within data in a designated diagnostic area within the memory device.

Example 17. The method of any one or more of Examples 12-16, wherein returning the memory sub-system to the normal state of operation comprises: identifying one or more errors within the memory sub-system based on an analysis of diagnostic data; clearing the one or more errors; restoring the set of registers to default or last-known-good states; and resuming command processing.

Example 18. The method of any one or more of Examples 12-17, wherein the operations comprise determining the one or more recovery actions based on diagnostic information received from the memory device, wherein performing the one or more recovery actions comprises sending one or more reset commands to the memory device.

Example 19. The method of any one or more of Examples 12-18, wherein determining whether the recovery of the memory device was successful comprises sending a status request to the memory device.

Example 20. A computer-readable storage medium comprising instructions that, when executed by a processing device, configure the processing device to perform operations comprising: detecting a communication error between a memory sub-system controller and a memory device; based on detecting the communication error, recording register data representing a current state of each register in a set of registers within the memory sub-system controller; suspending execution of command processing by the memory sub-system controller; storing command data comprising a snapshot of a command queue of the memory sub-system controller, the command queue comprising one or more commands; flushing the command queue; returning the memory sub-system to a normal state of operation; determining one or more recovery actions for the memory device based on diagnostic information received from the memory device; performing the one or more recovery actions to attempt recovery of the memory device; determining whether recovery of the memory device was successful; based on determining recovery of the memory device is unsuccessful, marking affected portions of the memory device as retired; and reissuing the one or more commands from the command queue.

Figure 4:
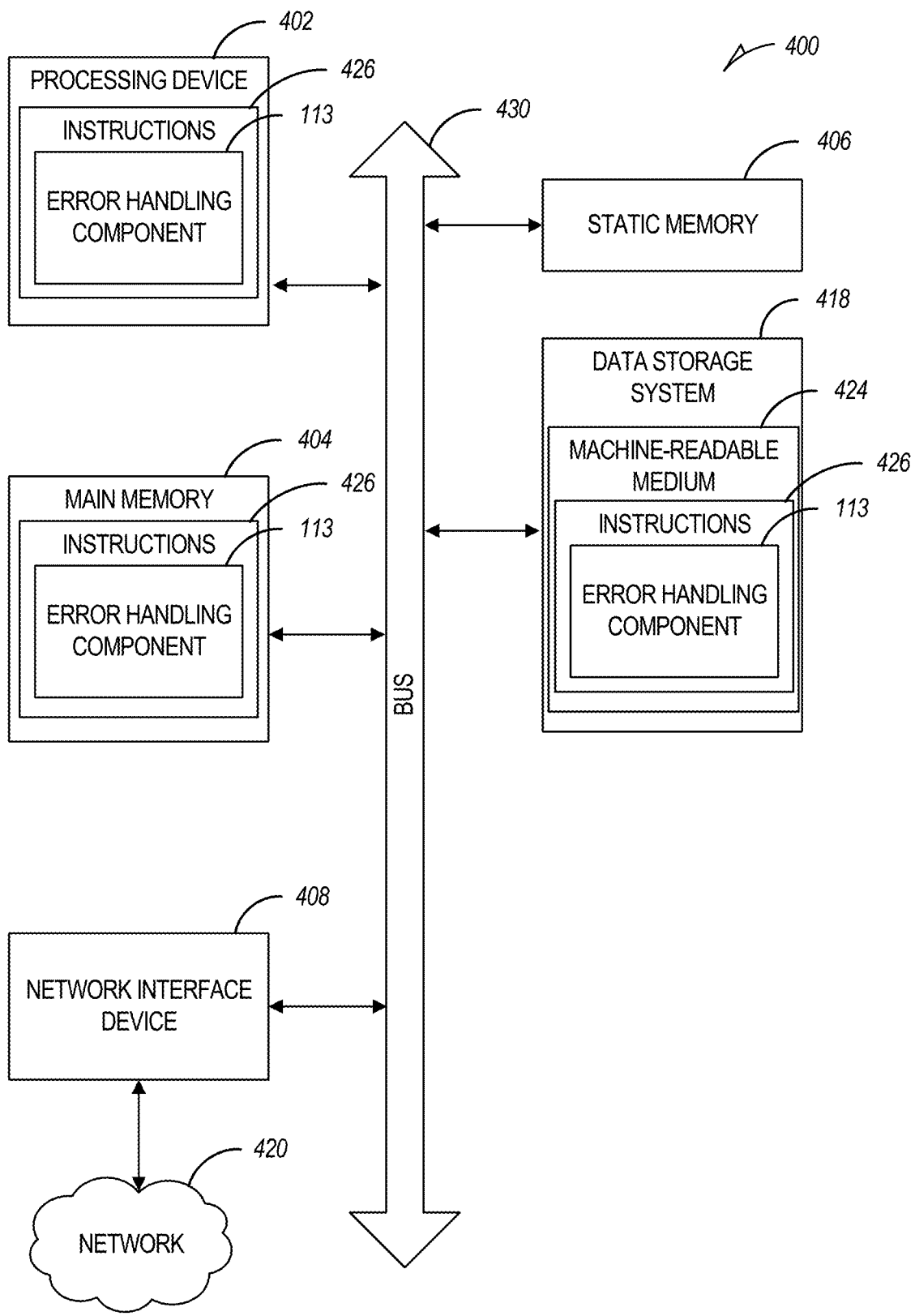
FIG. 4 is a block diagram of an example computer system in which embodiments of the present disclosure may operate.

FIG. 4 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the error handling component 113). In alternative embodiments, the machine can be connected (e.g., networked) to other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly executes a set (or multiple sets) of instructions to perform any one or more of the methodologies discussed herein.

The example computer system 400 includes a processing device 402, a main memory 404 (e.g., ROM, flash memory, DRAM such as SDRAM or RDRAM, etc.), a static memory 406 (e.g., flash memory, static random access memory (SRAM), etc.), and a data storage system 418, which communicate with each other via a bus 430.

Processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 can also be one or more special-purpose processing devices such as an ASIC, a FPGA, a digital signal processor (DSP), network processor, or the like. The processing device 402 is configured to execute instructions 426 for performing the operations and steps discussed herein. The computer system 400 can further include a network interface device 408 to communicate over a network 420.

The data storage system 418 can include a machine-readable storage medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage system 418, and/or main memory 404 can correspond to the memory sub-system 110 of FIG. 1.

In one embodiment, the instructions 426 include instructions to implement functionality corresponding to an error handling component (e.g., the error handling component 113 of FIG. 1). While the machine-readable storage medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, ROMs, RAMS, EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a ROM, RAM, magnetic disk storage media, optical storage media, flash memory components, etc.

In the foregoing specification, embodiments of the disclosure have been described with reference to specific example embodiments thereof. It will be evident that various modifications can be made thereto without departing from the broader scope of embodiments of the disclosure as set forth in the following claims. The specification and drawings are, accordingly, to be regarded in an illustrative sense rather than a restrictive sense.

What is claimed is:

1. A memory sub-system comprising:
   a memory device;
   a processing device coupled to the memory device, the processing device to perform operations comprising:
      detecting a communication error between a memory sub-system controller and the memory device;
      based on detecting the communication error, suspending execution of command processing by the memory sub-system controller;
      storing command data comprising a snapshot of a command queue of the memory sub-system controller, the command queue comprising one or more commands;
      flushing the command queue;
      returning the memory sub-system to a normal state of operation;
      performing one or more recovery actions to attempt recovery of the memory device;
      determining whether recovery of the memory device was successful;
      based on determining recovery of the memory device is unsuccessful, marking affected portions of the memory device as retired; and
      reissuing the one or more commands from the command queue.

2. The memory sub-system of claim 1, wherein detecting the communication error comprises detecting a missing data signal communicated between the memory device and the memory sub-system controller.

3. The memory sub-system of claim 1, wherein the operations comprise recording register data representing a current state of each register in a set of registers within the memory sub-system controller.

4. The memory sub-system of claim 3, wherein the set of registers comprises at least one of: a command register, a status register, a configuration register, or a special-purpose register related to operation of the memory device.

5. The memory sub-system of claim 3, wherein the register data comprises at least one of: data about ongoing commands, error codes, status flags, or other diagnostic parameters.

6. The memory sub-system of claim 3, wherein the recording the register data comprises storing the register data within data in a designated diagnostic area within the memory device.

7. The memory sub-system of claim 3, wherein returning the memory sub-system to the normal state of operation comprises:
   identifying one or more errors within the memory sub-system based on an analysis of diagnostic data;
   clearing the one or more errors;
   restoring the set of registers to default or last-known-good states; and
   resuming command processing.

8. The memory sub-system of claim 1, wherein performing the one or more recovery actions comprises sending one or more reset commands to the memory device.

9. The memory sub-system of claim 1, wherein the operations comprise determining the one or more recovery actions based on diagnostic information received from the memory device.

10. The memory sub-system of claim 1, wherein determining whether the recovery of the memory device was successful comprises sending a status request to the memory device.

11. The memory sub-system of claim 1, wherein the operations comprise attempting recovery of data stored by the affected portions of the memory device.

12. A method comprising:
  detecting, by a processing device, a communication error between a memory sub-system controller and a memory device;
  based on detecting the communication error,
    recording, by the processing device, register data representing a current state of each register in a set of registers within the memory sub-system controller;
    suspending, by the processing device, execution of command processing by the memory sub-system controller;
    storing, by the processing device, command data comprising a snapshot of a command queue of the memory sub-system controller, the command queue comprising one or more commands;
    flushing, by the processing device, the command queue;
    returning, by the processing device, the memory sub-system to a normal state of operation;
    performing, by the processing device, one or more recovery actions to attempt recovery of the memory device;
  determining, by the processing device, whether recovery of the memory device was successful;
  based on determining recovery of the memory device is unsuccessful, marking, by the processing device, affected portions of the memory device as retired; and
  reissuing, by the processing device, the one or more commands from the command queue.

13. The method of claim 12, wherein detecting the communication error comprises detecting a missing data signal communicated between the memory device and the memory sub-system controller.

14. The method of claim 12, wherein the set of registers comprises at least one of: a command register, a status register, a configuration register, or a special-purpose register related to operation of the memory device.

15. The method of claim 12, wherein the register data comprises at least one of: data about ongoing commands, error codes, status flags, or other diagnostic parameters.

16. The method of claim 12, wherein the recording the register data comprises storing the register data within data in a designated diagnostic area within the memory device.

17. The method of claim 12, wherein returning the memory sub-system to the normal state of operation comprises:
  identifying one or more errors within the memory sub-system based on an analysis of diagnostic data;
  clearing the one or more errors;
  restoring the set of registers to default or last-known-good states; and
  resuming command processing.

18. The method of claim 12, wherein the method comprises determining the one or more recovery actions based on diagnostic information received from the memory device, wherein performing the one or more recovery actions comprises sending one or more reset commands to the memory device.

19. The method of claim 12, wherein determining whether the recovery of the memory device was successful comprises sending a status request to the memory device.

20. A non-transitory computer-readable storage medium comprising instructions that, when executed by a processing device, configure the processing device to perform operations comprising:
  detecting a communication error between a memory sub-system controller and a memory device;
  based on detecting the communication error,
    recording register data representing a current state of each register in a set of registers within the memory sub-system controller;
    suspending execution of command processing by the memory sub-system controller;
    storing command data comprising a snapshot of a command queue of the memory sub-system controller, the command queue comprising one or more commands;
    flushing the command queue;
    returning the memory sub-system to a normal state of operation;
    determining one or more recovery actions for the memory device based on diagnostic information received from the memory device;
    performing the one or more recovery actions to attempt recovery of the memory device;
    determining whether recovery of the memory device was successful;
    based on determining recovery of the memory device is unsuccessful, marking affected portions of the memory device as retired; and
    reissuing the one or more commands from the command queue.

* * * * *